Sept. 15, 1931.	H. SUNDSTEDT	1,822,940
WING STRUCTURE FOR AIRPLANES
Filed Aug. 20, 1928	3 Sheets-Sheet 1
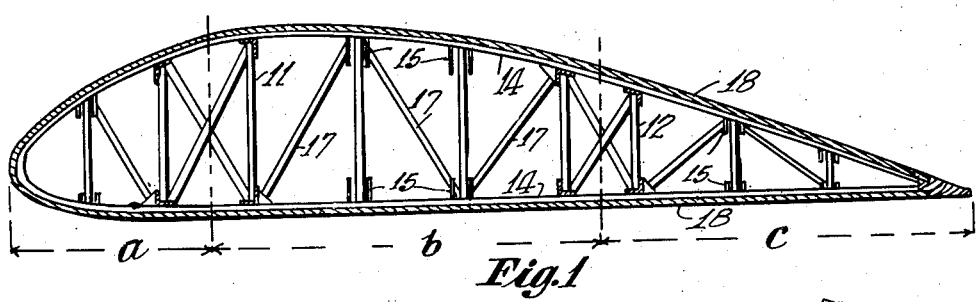
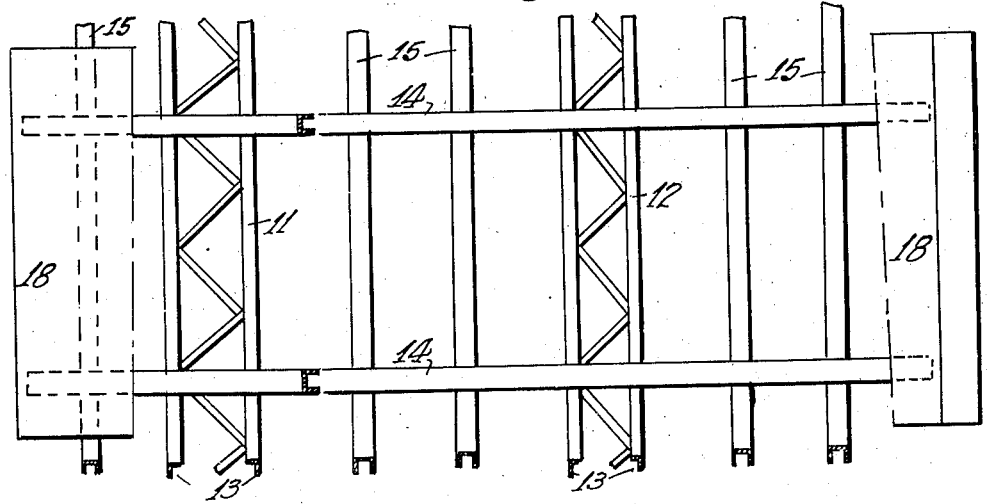
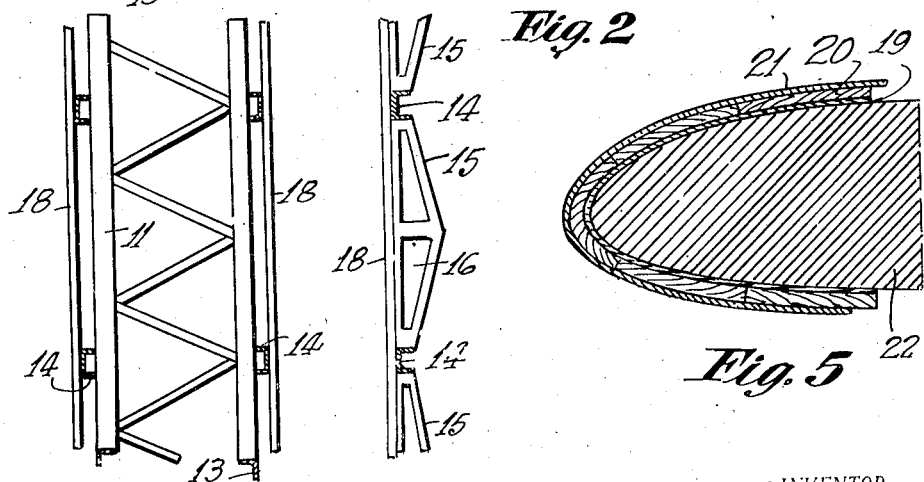

Sept. 15, 1931.   H. SUNDSTEDT   1,822,940
WING STRUCTURE FOR AIRPLANES
Filed Aug. 20, 1928   3 Sheets-Sheet 2
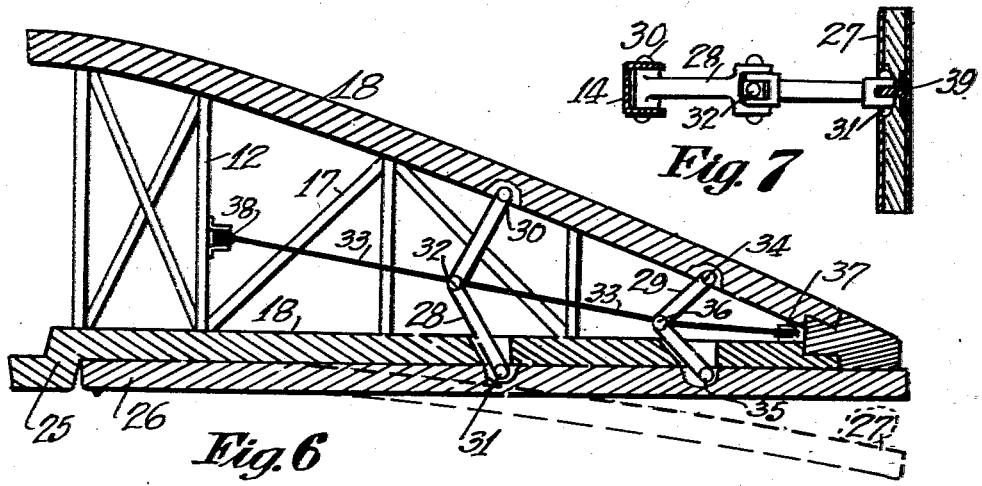
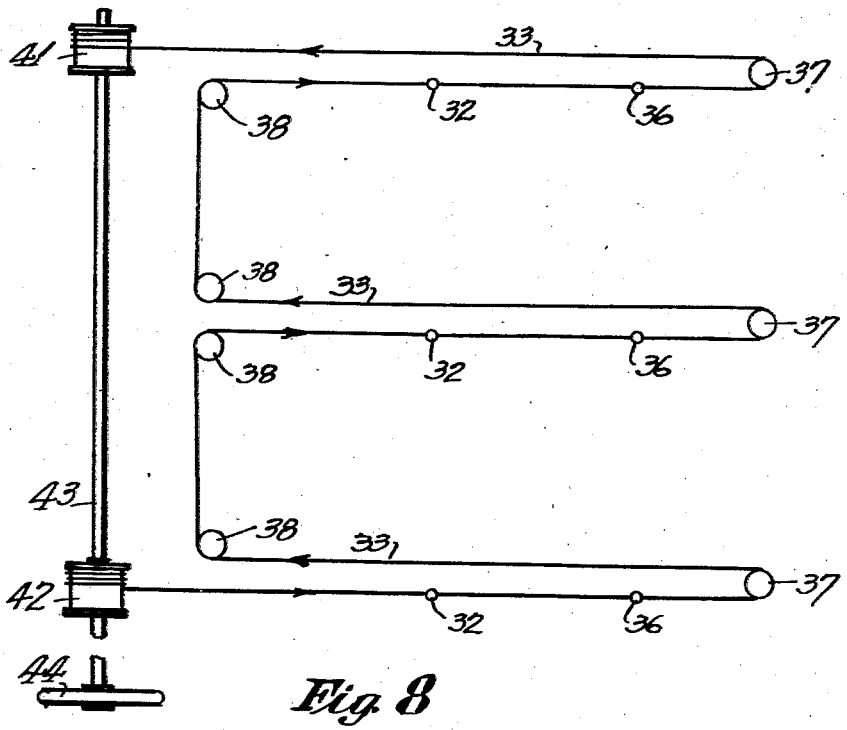
INVENTOR.
Hugo Sundstedt
BY
ATTORNEY.

Sept. 15, 1931.  H. SUNDSTEDT  1,822,940
WING STRUCTURE FOR AIRPLANES
Filed Aug. 20, 1928  3 Sheets-Sheet 3

Patented Sept. 15, 1931

1,822,940

UNITED STATES PATENT OFFICE

HUGO SUNDSTEDT, OF NEW YORK, N. Y., ASSIGNOR TO AMERICAN AVIGATION CORPORATION, OF NEW YORK, N. Y.

WING STRUCTURE FOR AIRPLANES

Application filed August 20, 1928. Serial No. 300,786.

Figure 9:
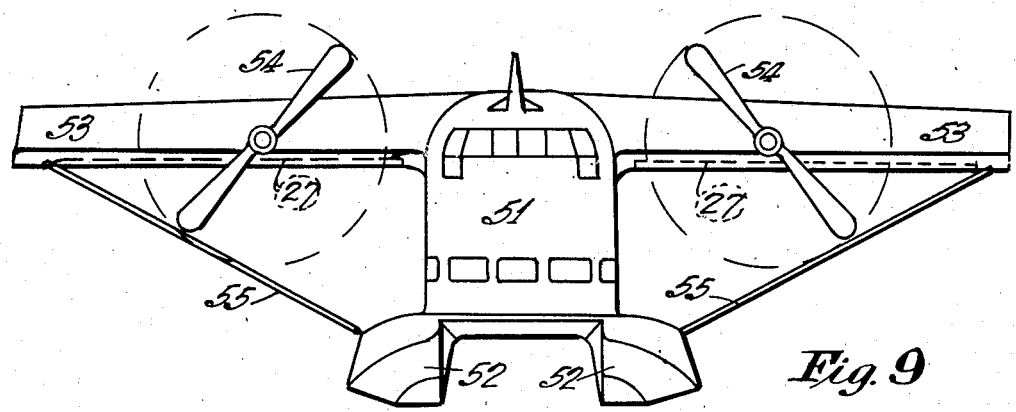
Figure 10:
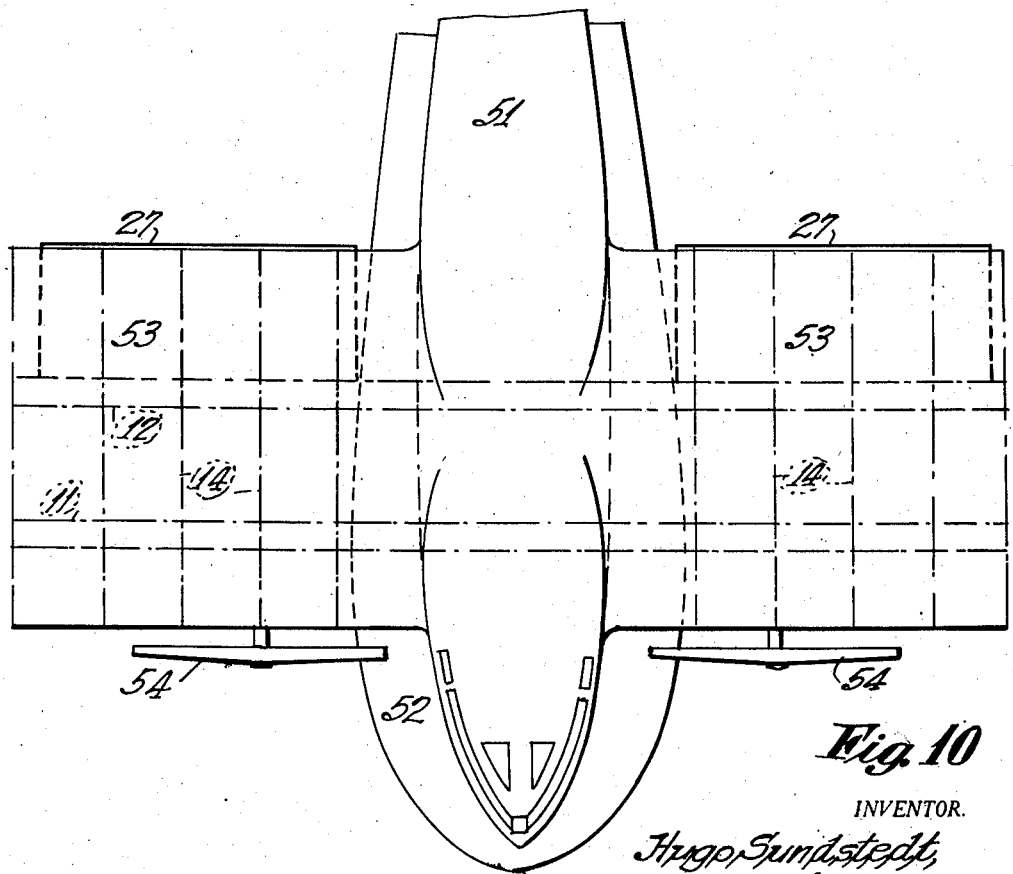

This invention relates to improvements in wing constructions for airplanes and has for an object to provide a comparatively rigid and light construction with a smooth covering for airplane wings, fuselage, etc., to provide a construction with transverse trusses formed to the contour of the wing and supported by longitudinal girders; to provide a construction in which the envelope comprises comparatively rigid plating secured to the frame work of the structure; to provide a construction in which the covering or envelope is made of balsa wood board covered on both sides with sheet metal; to provide a construction in which the covering is made in formed longitudinal sections and assembled on the frame; to provide a wing construction in which the angle of the lower side of the wing is adjustable and to provide an operating mechanism for adjusting the angle of the wing. Other objects of the invention will appear from the following specification and the accompanying drawings, in which, Fig. 1 is a transverse section of a wing and Fig. 2 is a plan view of the frame of the wing constructed according to my invention, Figs. 3 and 4 are details of the frame work, Fig. 5 shows in section one method of preforming a section of the covering; Fig. 6 shows in section a wing structure in which the angle of the lower side can be adjusted, Fig. 7 is a toggle mechanism used with Fig. 6, Fig. 8 shows one method of operating the adjustable wing mechanism, Fig. 9 is a front view of a plane embodying my invention and Fig. 10 is a plan view of a plane embodying the features of my invention.

In airplane construction an envelope that will not shrink under stress, that is smooth and has a certain amount of rigidity possesses some advantages over fabric and permits a modified construction in the framework, which can be made lighter and stronger and the construction of large planes is thereby simplified. The envelope, according to this invention, is constructed of boards of balsa wood one quarter inch thickness, being suitable for certain sizes. This board is covered on both sides by thin sheets of duralumin or similar sheet metal which is applied under pressure with an adhesive and at the same time is formed to the contour desired for the section of the plane where the envelope is to be used. The envelope is thus built up to the shape desired and sets rigidly to form and corrugations and obstructions are avoided on the exterior.

The wings are supported by two main, longitudinal, lattice girders passing through the fuselage and supporting at intervals, transverse trusses formed to the contour of the wing. Channels are provided between these trusses and the envelope rests upon and is secured to these channels. The envelope is preferably made in longitudinal sections built upon a form and applied in these sections as a rigid covering to the frame. A light, strong and durable construction is thus obtained.

Owing to the rigid nature of the envelope it is possible to adjust the position of the envelope, or portions thereof, with relation to the frame and in the present invention use is made of this adjustment to vary the angle of the lower side of the wing so that this angle may be increased on the take off and at landing thereby shortening the distance for these operations. When in flight the adjustable portion of the wing cover is collapsed to the normal position. The mechanism for adjusting this envelope supports it from the frame at a plurality of points by a toggle mechanism cooperatively operated throughout the adjustable section.

In the drawings, 11 is the front, longitudinal, lattice girder and 12 is the rear, longitudinal, lattice girder. These are also referred to as the main girders. It will be noted that they are constructed of angles 13 tied together with a lattice construction as shown and they extend across the fuselage as indicated in Fig. 10.

The transverse truss is formed by the channels 14 which pass over the main girders and are shaped to the contour of the wing or part. These channels are connected by the lattice bars 17 as shown and support the intermediate channel bars 15 extending between the trusses. These channel bars are preferably formed from punched stock shaped as shown in Fig. 4 with the open spaces at 16 and placed flush with the channels 14 so as to make an even continuous bed for the covering 18.

The envelope or cover may be formed as indicated in Fig. 5 on the form 22. The cover comprises the inner sheet 19 of duralumin, the balsa board 20 and the outer metallic sheet 21. Balsa board is light and porous and can readily be bent to the form desired when in thin boards. Balsa is preferred for this purpose due to its lightness and resistance to compression, but fibre or other woods may be used for this purpose where weight is not objectionable. The envelope is assembled in sections under pressure with an adhesive between the layers of sheet metal and balsa wood and when the adhesive has set the sections are removed from the form and are ready to be applied to the frame.

As indicated in Fig. 1 the envelope may be built in the sections a, b and c. The section a includes the front, or nose of the wing, the section b includes the upper and lower envelope between the main girders and the section c includes the rear portion of the wing from the rear girder. The sections of the envelope are, preferably, made continuous throughout the wing and may be joined at the centre of the girder, or at any other convenient point. It is apparent that this rigid envelope extending throughout the wing is an important reinforcing and staying element of the wing and it is believed that it lessens the cost of construction.

From Fig. 6 it will be noted that the underside of the rear section of the wing has a double envelope. The normal envelope 18 is offset inwardly at 25 to make a space for the additional covering 26 flush with the lower side of the wing. This covering is rigidly secured at 26, preferably to the rear main girder and by its own elasticity it may be deflected as indicated in dotted outline at 27 so as to change the angle of the lower side of the wing and thereby aid the take off, or retard the landing. The flexible section 27 is reinforced with transverse T bars 39 Fig. 7 and is deflected through these T bars by the toggles 28 and 29. Toggle 28 is pivoted to the channel 14 at 30 and to the T bar at 31. Toggle 29 is pivoted to the channel 14 at 34 and to the T bar at 35. Toggle 28 is connected at 32 to the cable 33 and toggle 29 is connected to the same cable at 36. As this cable is moved around the pulleys 38 and 37 in one direction the toggles are collapsed to close up the cover 27 against the cover 18. When cable 33 is moved in the opposite direction the toggles are straightened out and 27 is deflected as indicated. It will be noted that toggle 29 has a greater angle than toggle 28 so that for the same movement of the cable a greater deflection is obtained by 29 than by 28, thus a graduated deflection is produced in the lower side of the wing increasing towards the rear of the wing.

In practice the flexible portion of the cover is intended to extend over a considerable area of wing. As indicated in Fig. 9, it extends from the fuselage to the connection of the struts 55 and a row of toggles corresponding to 28 and 29 are necessary to give a distributed support to the adjustable section. The arrangement in Fig. 8 may be used to secure this result. It will be noted that the cable 33 passes over a series of pulleys 37—38 and is taken up on roller 41 as it is let out on roller 42. These rollers are connected by shaft 43 and are operated by the hand wheel 44. The toggles are connected at 32 and 36 and are moved in unison with the cable and with each other.

In practice the adjustment of the flexible section of the wing is a comparatively easy operation. When the plane is at rest it is apparent that there can be no more opposition to deflecting the adjustable section than that necessary to flex the adjustable covering. When the plane is in motion the fuselage may be tilted from the horizontal in the opposite direction to that in which the covering is to be deflected. This substantially reduces the wind stress on the flexed part of the wing so that it may be deflected the same as when the plane is at rest. When the flexed portion is collapsed against the normal covering it is supported thereby relieving the toggle connections from all strain, and when the covering is deflected, the toggles are straightened out and are thus in the best position to take up the thrust of the stresses on the covering.

The illustrations in Figs. 9 and 10 show this invention applied to a mono-plane of the hydro-plane type as shown in my co-pending application, Serial No. 123,053, filed July 17, 1926. The fuselage is indicated by 51, the pontoons by 52, the wings by 53, the propellers by 54 and the struts by 55. The super-structure of the wing frame is indicated in dotted outline in Fig. 10.

The illustrations are intended to show only one form of my invention which it is to be understood is of general application in the construction of air craft and not in any sense restricted to the type shown.

Having thus described my invention, I claim;

1. An airplane wing construction comprising main longitudinal girders, transverse trusses formed to the wing contour secured at intervals to said girders, connecting channel bars between said trusses and a comparatively rigid covering of balsa wood enclosed by sheet metal secured to said channels.

2. An airplane wing construction comprising main longitudinal girders, transverse trusses formed to the wing contour secured at intervals to said girders, connecting channel bars between said trusses and a covering comprising a plurality of sheets of duralumin spaced by balsa wood secured to said channels.

3. An airplane wing construction comprising main longitudinal girders, transverse trusses formed to the contour of the wing and secured at intervals to said girders, trussed bars between said trusses forming a frame and a substantially rigid covering made of sheet metal and balsa wood in longitudinal sections and preformed before assembling to the contour of the wing, said sections being joined on the line of said girders and supported by said bars.

4. An airplane wing construction comprising main longitudinal girders, transverse trusses formed to the contour of the wing and secured at intervals to said girders, connecting channel bars between said trusses and a covering for said wing comprising a plurality of sheets of duralumin spaced by balsa board, made to shape on a form and assembled on said channel bars.

5. In an aircraft construction, the combination of a frame, a substantially rigid covering secured to said frame and having a portion free to be flexed and a plurality of toggles set at different angles controlling the operation of said free portion.

6. In an aircraft construction, the combination of a frame, a substantially rigid covering secured to said frame and having a portion free to be flexed, a plurality of toggles connecting said free portion with said frame and means for simultaneously varying the angle of said toggles as said free portion is flexed.

7. An airplane wing construction comprising main longitudinal girders, transverse trusses formed to the wing contour secured at intervals to said girders, connecting bars between said trusses forming a frame and a comparatively rigid covering made in longitudinal sections of sheet stock with a spacer of balsa wood formed to the contour of the edge of said wing and assembled on said wing.

In testimony whereof I affix my signature.

HUGO SUNDSTEDT.